US012492596B2

(12) United States Patent
Gealy et al.

(10) Patent No.: US 12,492,596 B2
(45) Date of Patent: Dec. 9, 2025

(54) THREE SECTION EXTENSION LADDER

(71) Applicant: Werner Co., Greenville, PA (US)

(72) Inventors: Preston L. Gealy, Youngstown, OH (US); Kevin L. McIntire, Stoneboro, PA (US); Robert D. Beggs, Stoneboro, PA (US)

(73) Assignee: Werner Co., Itasca, IL (US)

( * ) Notice: Subject to any disclaimer, the term of this patent is extended or adjusted under 35 U.S.C. 154(b) by 937 days.

(21) Appl. No.: 17/699,070

(22) Filed: Mar. 18, 2022

(65) Prior Publication Data

US 2022/0205321 A1 Jun. 30, 2022

Related U.S. Application Data

(63) Continuation of application No. 13/373,122, filed on Nov. 5, 2011, now Pat. No. 11,286,716.

(51) Int. Cl.

*E06C 1/08* (2006.01)
*A45F 5/10* (2006.01)
*E06C 7/06* (2006.01)

(52) U.S. Cl.

CPC . *E06C 1/08* (2013.01); *E06C 7/06* (2013.01)

(58) Field of Classification Search

CPC ..... E06C 7/06; E06C 1/08; E06C 1/12; A45F 5/10

See application file for complete search history.

(56) References Cited

U.S. PATENT DOCUMENTS

| | | | | | |
|---|---|---|---|---|---|
| 1,949,972 | A | * | 3/1934 | Murphy | E06C 1/12 182/212 |
| 2,760,706 | A | * | 8/1956 | Pearl | E06C 7/06 182/211 |
| 3,464,522 | A | | 9/1969 | Kramer | |
| 3,768,123 | A | | 10/1973 | Forte | |
| 4,226,302 | A | * | 10/1980 | Roche | E06C 1/10 182/178.4 |
| 4,926,964 | A | * | 5/1990 | Herrin | E06C 1/32 182/209 |
| 5,758,745 | A | * | 6/1998 | Beggs | E06C 1/12 182/213 |
| 5,762,242 | A | * | 6/1998 | Yost | A63C 11/021 224/258 |
| 5,878,836 | A | * | 3/1999 | Huang | E06C 1/12 182/86 |

(Continued)

*Primary Examiner* — David E Martinez

(74) *Attorney, Agent, or Firm* — Fitch, Even, Tabin & Flannery LLP

(57) ABSTRACT

An extension ladder including a base section and an intermediate fly section. The intermediate fly section slidably attached to the base section. The extension ladder including a top fly section. The top fly section sliding attached to the intermediate fly. The extension ladder including a handle having a first strap portion attached to the base section having a first buckle portion, and a second strap portion attached to the top fly section having a second buckle portion that engages with the first buckle portion when the base section, intermediate fly section and top fly section are in a folded state where they essentially form a shape of a cube so the base section, intermediate fly section and top fly section can be lifted by the handle. The present invention pertains to a method of moving an extension ladder.

18 Claims, 7 Drawing Sheets

(56) References Cited

U.S. PATENT DOCUMENTS

| | | | | |
|---|---|---|---|---|
| 5,896,945 | A * | 4/1999 | Boelling | E06C 7/48 182/129 |
| 6,193,012 | B1 * | 2/2001 | Olivas | E06C 7/50 224/257 |
| 6,269,909 | B1 | 8/2001 | Grimes | |
| 6,296,165 | B1 | 10/2001 | Mears | |
| 6,672,494 | B1 * | 1/2004 | Fernandez | E06C 7/00 224/268 |
| 6,935,464 | B2 | 8/2005 | Duan | |
| 7,762,441 | B1 | 7/2010 | Benally | |
| 11,286,716 | B2 | 3/2022 | Gealy | |
| 2002/0079166 | A1 * | 6/2002 | Gaik | E06C 7/06 182/213 |
| 2004/0045770 | A1 * | 3/2004 | Duan | E06C 1/12 182/213 |
| 2008/0185223 | A1 | 8/2008 | Lem | |
| 2013/0009414 | A1 * | 1/2013 | LeClaire | E06C 7/00 294/151 |
| 2013/0112501 | A1 | 5/2013 | Gealy | |

* cited by examiner

THREE SECTION EXTENSION LADDER

CROSS-REFERENCE TO RELATED APPLICATIONS

This is a continuation of U.S. patent application Ser. No. 13/373,122 filed Nov. 5, 2011, now U.S. Pat. No. 11,286,716, incorporated by reference herein.

FIELD OF THE INVENTION

The present invention is related to an extension ladder having a base section, intermediate fly section and top fly section that is lifted by a handle formed from a first strap portion attached to a base section and a second strap portion attached to a top fly section. (As used herein, references to the "present invention" or "invention" relate to exemplary embodiments and not necessarily to every embodiment encompassed by the appended claims.) More specifically, the present invention is related to an extension ladder having a base section, intermediate fly section and top fly section that is lifted by a grip of a handle formed from a first strap portion section having a first buckle portion attached to a base section and a second strap portion attached to the top fly section having a second buckle portion that engages with the first buckle portion attached to a top fly section.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Typical extension ladders have two sections (base and fly) to permit length adjustment to access desired working heights. A two section extension ladder typically comes in 16', 20', 24', 28', 32', 36' and 40' sizes. When two section extension ladders are fully retracted, they can measure about 8', 10', 12', 14', 16', 18' and 20' in overall length. These retracted lengths can be bulky and make maneuverability, indoor use, storage and transportation difficult.

BRIEF SUMMARY OF THE INVENTION

The present invention pertains to a new three section extension ladder design that will improve the maneuverability, indoor use, storage and transportation of a two section extension ladder.

The present invention pertains to an extension ladder. The extension ladder comprises a base section having two side rails with rungs spanning horizontally between them that are fixed a set distance apart. The extension ladder comprises an intermediate fly section having two side rails with rungs spanning horizontally between them that are fixed a set distance apart, the intermediate fly section slidably attached to the base section. The extension ladder comprises a top fly section having two side rails with rungs spanning horizontally between them that are fixed a set distance apart, the top fly section sliding attached to the intermediate fly section with the intermediate fly section disposed between the base and the top fly section. The extension ladder comprises a handle having a first strap portion attached to the base section having a first buckle portion, and a second strap portion attached to the top fly section having a second buckle portion that engages with the first buckle portion when the base section, intermediate fly section and top fly section are in a folded state where they essentially form a shape of a cube so the base section, intermediate fly section and top fly section can be lifted by the handle, and a grip positioned about the second strap portion.

The present invention pertains to an extension ladder. The extension ladder comprises a base section having two side rails, each having a cross-sectional shape of a C facing towards a centerline, with rungs spanning horizontally between them that are fixed a set distance apart. The extension ladder comprises an intermediate fly section having two side rails, each having a cross-sectional shape of a C facing away from the centerline, with rungs spanning horizontally between them that are fixed a set distance apart. The intermediate fly section is slidably attached to the base section. The extension ladder comprises a top fly section having two side rails, each having a cross-sectional shape of a C facing towards a centerline, with rungs spanning horizontally between them that are fixed a set distance apart. The top fly section is slidingly attached to the intermediate fly section with the intermediate fly section disposed between the base and the top fly section. The C shape of the rails of the base and top fly sections interlocking with the C shape of the rails of the intermediate fly section. The extension ladder comprises a handle that engages with the base section, intermediate fly section and top fly section when they are in a folded state where they essentially form a shape of a cube so the base section, intermediate fly section and top fly section can be lifted by the handle.

The present invention pertains to an extension ladder. The extension ladder comprises a base section having two side rails, each having a cross-sectional shape of a C facing towards a centerline, with rungs spanning horizontally between them that are fixed a set distance apart. The extension ladder comprises an intermediate fly section having two side rails with rungs spanning horizontally between them that are fixed a set distance apart. The intermediate fly section is slidably attached to the base section. The intermediate fly section has two pivoting ladder lock mechanisms located near the bottom of the intermediate fly section to prohibit movement of the intermediate fly section along a center line of the ladder towards ground when the base, intermediate fly and top fly sections are in an extended state. Each locking mechanism has a flipper which prevents a rung from engaging a lock of the lock mechanism during ladder length adjustment. The extension ladder comprises a top fly section having two side rails with rungs spanning horizontally between them that are fixed a set distance apart. The top fly section is slidingly attached to the intermediate fly section with the intermediate fly section disposed between the base and the top fly section. The extension ladder comprises a handle that engages with the base section, intermediate fly section and top fly section when they are in a folded state where they essentially form a shape of a cube so the base section, intermediate fly section and top fly section can be lifted by the handle.

The present invention pertains to a method of moving an extension ladder. The method comprises the steps of moving a base section having two side rails with rungs spanning horizontally between them that are fixed a set distance apart, an intermediate fly section having two side rails with rungs spanning horizontally between them that are fixed a set distance apart, the intermediate fly section slidably attached to the base section, and a top fly section having two side rails with rungs spanning horizontally between them that are fixed a set distance apart, the top fly section sliding attached to the intermediate fly section with the intermediate fly section disposed between the base and the top fly section into a folded state where they essentially form a shape of a cube. There is the step of engaging a first buckle portion of a first strap portion attached to the base section with a second strap portion attached to the top fly section to form a handle. There is the step of grabbing a grip positioned about the second strap portion. There is the step of lifting the base section, intermediate fly section and top fly section by the handle.

BRIEF DESCRIPTION OF THE DRAWINGS

In the accompanying drawings, the preferred embodiment of the invention and preferred methods of practicing the invention are illustrated in which.

DETAILED DESCRIPTION OF THE INVENTION

Figure 1:
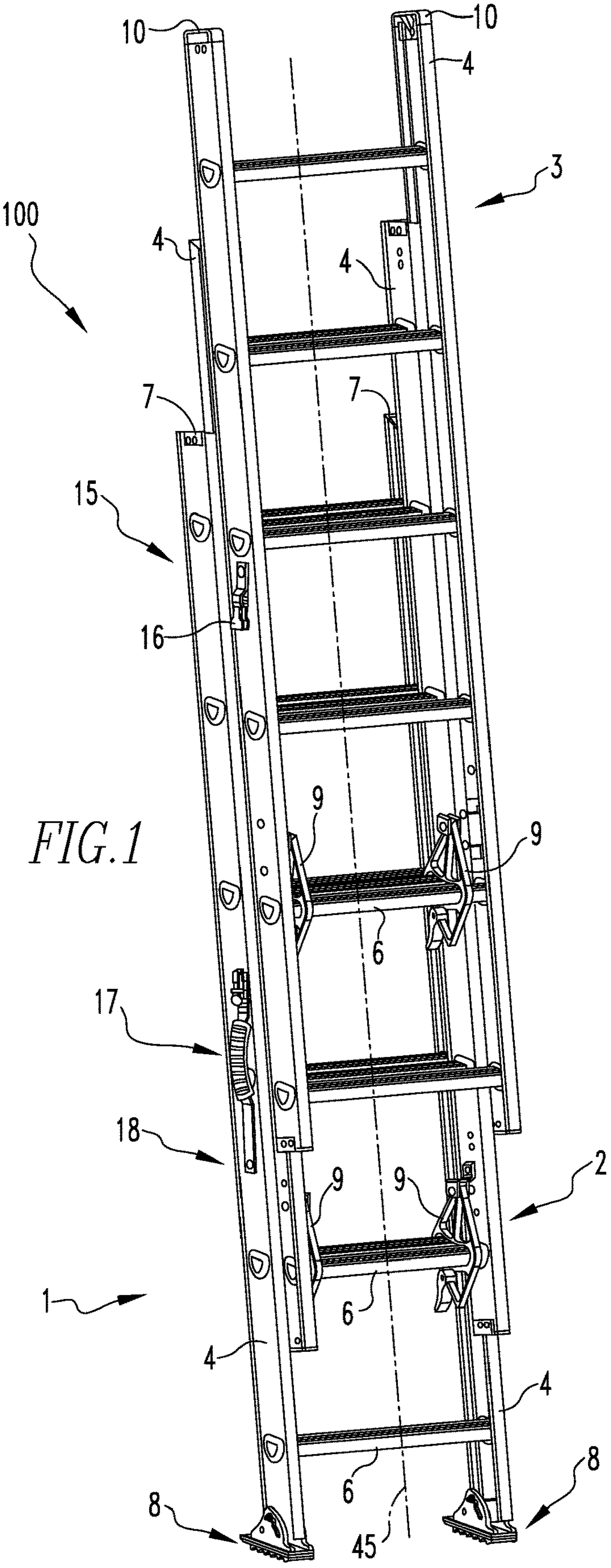
FIG. 1 is a perspective view of the extension ladder of the present invention in the extended state.
Figure 2:
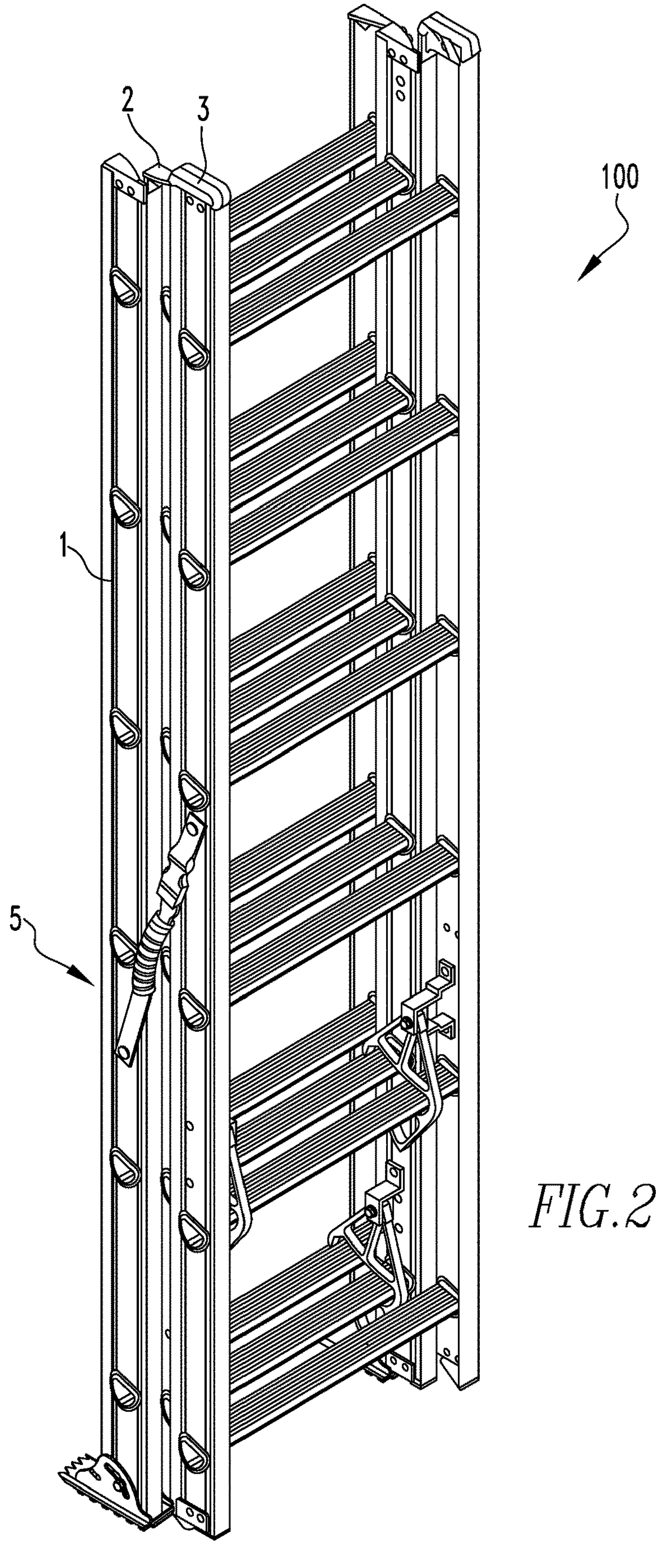
FIG. 2 is a perspective view of the extension ladder of the present invention in the folded state.
Figure 3:
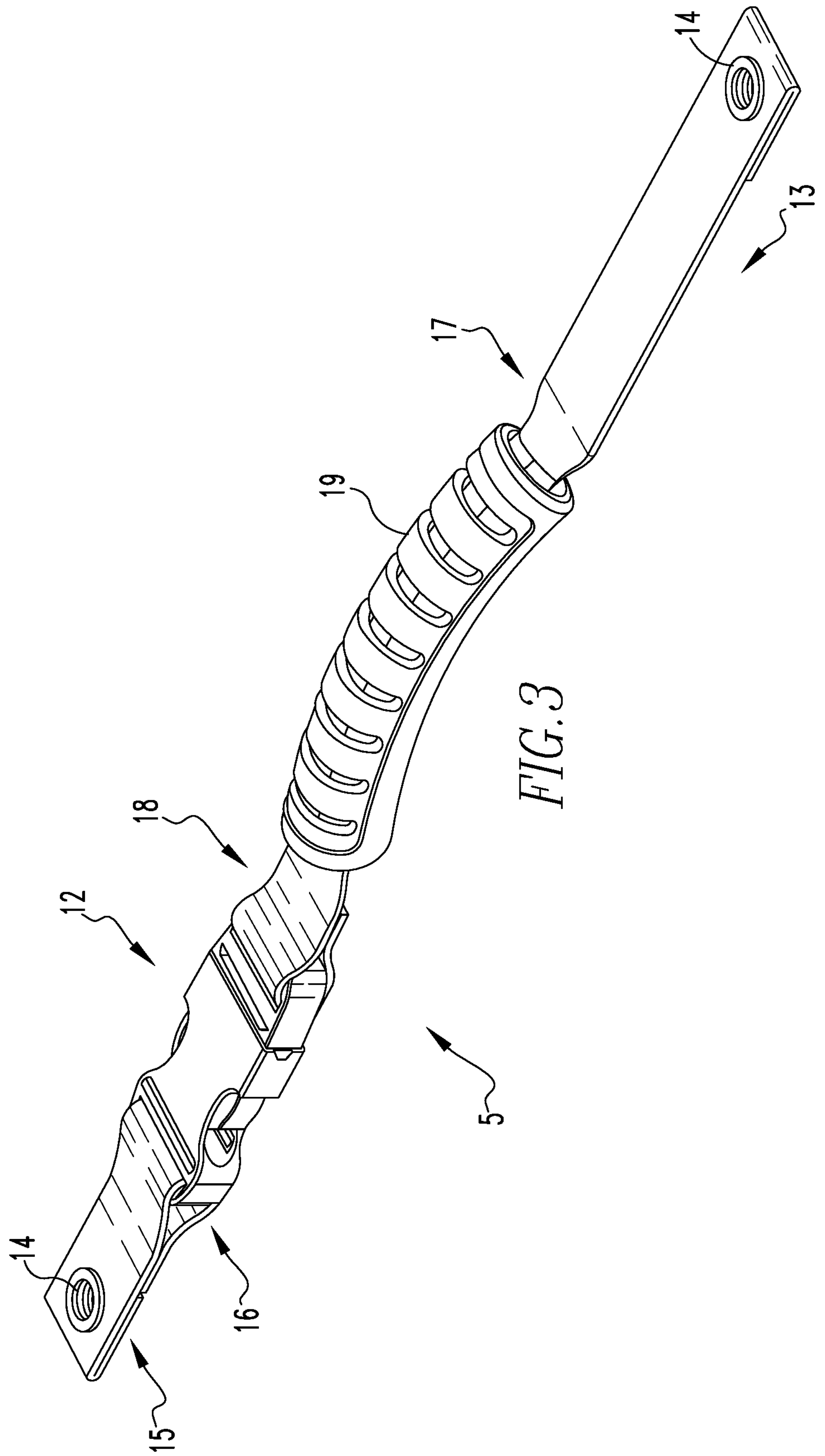
FIG. 3 is a perspective view of the handle of the present invention.

Referring now to the drawings wherein like reference numerals refer to similar or identical parts throughout the several views, and more specifically to FIG. 1 thereof, there is shown an extension ladder. The ladder 100 may be made out of aluminum or fiberglass. The extension ladder comprises a base section 1 having two side rails 4 with rungs 6 spanning horizontally between them that are fixed a set distance apart. The extension ladder comprises an intermediate fly section 2 having two side rails 4 with rungs 6 spanning horizontally between them that are fixed a set distance apart, the intermediate fly section 2 slidably attached to the base section 1. The extension ladder comprises a top fly section 3 having two side rails 4 with rungs 6 spanning horizontally between them that are fixed a set distance apart, the top fly section 3 sliding attached to the intermediate fly section 2 with the intermediate fly section 2 disposed between the base and the top fly section 3. The extension ladder comprises a handle 5, as shown in FIG. 3, having a first strap portion 15 attached to the base section 1 having a first buckle portion 16, and a second strap portion 17 attached to the top fly section 3 having a second buckle portion 18 that engages with the first buckle portion 16 when the base section 1, intermediate fly section 2 and top fly section 3 are in a folded state, as shown in FIG. 2, where they essentially form a shape of a cube so the base section 1, intermediate fly section 2 and top fly section 3 can be lifted by the handle 5, and a grip 19 positioned about the second strap portion 17.

The base section 1 may have two pivoting feet 8 located at the bottom of the base section 1 which allows adjustability for undesirable ground surfaces when the base, intermediate fly and top fly sections 2, 3 are in an extended state, where the top of the intermediate fly section is higher than the top of the base section and the top of the top fly section is higher than the top of the intermediate fly section relative to ground and the ladder is then able to rest against a structure at an angle and a user can climb the ladder. The intermediate fly section 2 may have two pivoting ladder lock mechanisms located near the bottom of the intermediate fly section 2 to prohibit movement of the intermediate fly section 2 along a center line of the ladder towards the ground surface when the base, intermediate fly and top fly sections 2, 3 are in the extended state. The top fly section 3 may have two pivoting ladder lock mechanisms located near the bottom of the top fly section 3 to prohibit movement of the top fly section 3 along the centerline of the ladder towards the ground surface. The top fly section 3 may have two end caps when the base, intermediate fly and top fly sections 2, 3 are in the extended state. In the extended state, the intermediate fly section 2 extends above from the base section 1, and the top fly section 3 extends above from the intermediate fly section 2 so the base, intermediate fly and top fly section 3 form a step function.

The present invention pertains to a method of moving an extension ladder. The method comprises the steps of moving a base section 1 having two side rails 4 with rungs 6 spanning horizontally between them that are fixed a set distance apart, an intermediate fly section 2 having two side rails 4 with rungs 6 spanning horizontally between them that are fixed a set distance apart, the intermediate fly section 2 slidably attached to the base section 1, and a top fly section 3 having two side rails 4 with rungs spanning horizontally between them that are fixed a set distance apart, the top fly section 3 sliding attached to the intermediate fly section 2 with the intermediate fly section 2 disposed between the base and the top fly section 3 into a folded state where they essentially form a shape of a cube. There is the step of engaging a first buckle portion 16 of a first strap portion 15 attached to the base section 1 with a second strap portion 17 attached to the top fly section 3 to form a handle 5. There is the step of grabbing a grip 19 positioned about the second strap portion 17. There is the step of lifting the base section 1, intermediate fly section 2 and top fly section 3 by the handle 5.

There may be the step of prohibiting movement of the intermediate fly section 2 along a center line of the ladder towards the ground surface with two pivoting ladder lock mechanisms located near the bottom of the intermediate fly section 2 when the base, intermediate fly and top fly sections 2, 3 are in the extended state. There may be the step of prohibiting movement of the top fly section 3 along the centerline of the ladder towards the ground surface with two pivoting ladder lock mechanisms located near the bottom of the top fly section 3 when the base, intermediate fly and top fly sections 2, 3 are in the extended state. The top fly section 3 may have two end caps. The base section 1 may have two pivoting feet 8 located at the bottom of the base section 1 which allows adjustability for undesirable ground surfaces when the base, intermediate fly and top fly sections 2, 3 are in the extended state.

The present invention pertains to an extension ladder 100. The extension ladder 100 comprises a base section 1 having two side rails, each having a cross-sectional shape of a C facing towards a centerline 45, with rungs spanning horizontally between them that are fixed a set distance apart. The extension ladder comprises an intermediate fly section 2 having two side rails, each having a cross-sectional shape of a C facing away from the centerline 45, with rungs spanning horizontally between them that are fixed a set distance apart. The intermediate fly section 2 is slidably attached to the base section 1. The extension ladder 100 comprises a top fly section 3 having two side rails, each having a cross-sectional shape of a C facing towards a centerline 45, with rungs spanning horizontally between them that are fixed a set distance apart. The top fly section 3 is slidingly attached to the intermediate fly section 2 with the intermediate fly section 2 disposed between the base and the top fly section. The C shape of the rails of the base and top fly sections interlocking with the C shape of the rails of the intermediate fly section 2. The extension ladder comprises a handle that engages with the base section, intermediate fly section and top fly section when they are in a folded state where they essentially form a shape of a cube so the base section, intermediate fly section and top fly section can be lifted by the handle.

The present invention pertains to an extension ladder 100. The extension ladder 100 comprises a base section 1 having two side rails, with rungs spanning horizontally between them that are fixed a set distance apart. The extension ladder 100 comprises an intermediate fly section 2 having two side rails with rungs spanning horizontally between them that are fixed a set distance apart. The intermediate fly section 2 is slidably attached to the base section 1, the intermediate fly section 2 has two pivoting ladder lock mechanisms 9 located near the bottom of the intermediate fly section 2 to prohibit movement of the intermediate fly section 2 along a center line 45 of the ladder 100 towards ground when the base, intermediate fly and top fly sections are in an extended state. Each locking mechanism 9 has a flipper 18 which prevents a rung from engaging a lock of the lock mechanism during ladder length adjustment. The extension ladder comprises a top fly section having two side rails with rungs spanning horizontally between them that are fixed a set distance apart. The top fly section is slidingly attached to the intermediate fly section with the intermediate fly section disposed between the base and the top fly section. The extension ladder comprises a handle that engages with the base section, intermediate fly section and top fly section when they are in a folded state where they essentially form a shape of a cube so the base section, intermediate fly section and top fly section can be lifted by the handle.

In the operation of the invention, a simplified 3 section extension ladder is shown in FIG. 1. There are three major sections [base 1, intermediate fly 2 and top fly 3]. The sections are held together by interlocking side rails 4 which allow adjustability along the centerline of the ladder. The section travel is limited by the use of stop brackets attached to the side rails 4. There is a carrying handle 5 located on the side rails 4 that serve as means to make the 3 section extension ladder portable and also to prohibit the sections from extending when lifting, carrying or transporting the ladder.

The base section 1 has two side rails 4 with rungs 6 spanning horizontally between them and are fixed a set distance apart by a connection means. There are two rail closures 7 fastened near the end of the rail to protect the end user from sharp edges of each side rail 4 at the top of the section. There are two pivoting feet 8 located at the bottom of the section which allow adjustability for undesirable ground surfaces.

The intermediate fly 2 section has two side rails 4 with rungs 6 spanning horizontally between them and are fixed a set distance apart by a connection means. There are four rail closures 7 to protect the end user from sharp edges of each side rail 4 at the top and bottom of the section. There are two pivoting ladder lock mechanisms 9 located near the bottom of the section to prohibit movement of the intermediate fly 2 section along the centerline of the ladder towards the ground surface.

The top fly 3 section has two side rails 4 with rungs 6 spanning horizontally between them and are fixed a set distance apart by a connection means. There are two end caps 10 and two rail closures 7 to protect the end user from the cut edges of each side rail 4 at the top and bottom of the section. There are two pivoting ladder lock mechanisms 9 located near the bottom of the section to prohibit movement of the top fly 3 section along the centerline of the ladder towards the ground surface.

FIG. 3 is a detailed view of the carrying handle 5. The carrying handle 5 will be made up of multiple components. There will be a plastic molded handle 11 for user comfort when transporting the ladder. There will be a buckle 12 that when clasped, will restrict major movement of the ladder sections and create a means for the user to transport the ladder. There will be a strap 13 connecting all of the carrying handle 5 components together. The carrying handle 5 will be attached to the base section 1 and the top fly 3 section by means of a fastener 14 through the side rail 4.

Figure 4:
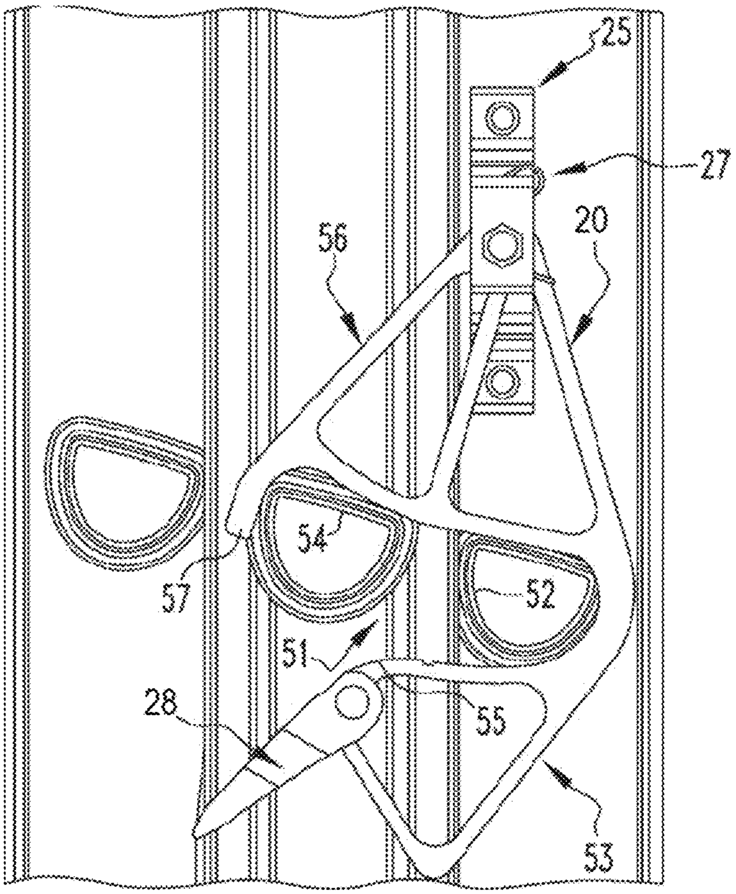
FIG. 4 is a detailed side view of a lock mechanism of the ladder.

FIG. 4 is a detailed view of the area near one of the top fly section lock mechanisms 9. The lock mechanism 9 is made up of four components: lock bracket 25, lock 26, spring 27 and flipper 28. The lock bracket 25 will be permanently attached to the inside of the ladder rail. The lock 26 will be pivotally attached to the lock bracket 25 and utilize a spring 27 integrated into the lock mechanism 9 to provide a constant torque on the lock 26 so that it properly engages the rungs when locking the ladder or the flipper 28 during ladder length adjustment.

The issue with the use of a pivoting ladder locking mechanism is in the interaction between the flipper 28 and the rungs. When the lock is in the unlocked position (see FIG. 5) and the top fly section 3 is allowed to move downward, the flipper 28 can wedge between the rungs on the base section 2 and the rungs on the intermediate fly section 2. The geometry of the flipper 28 has been created to prevent such an issue.

Figure 7:
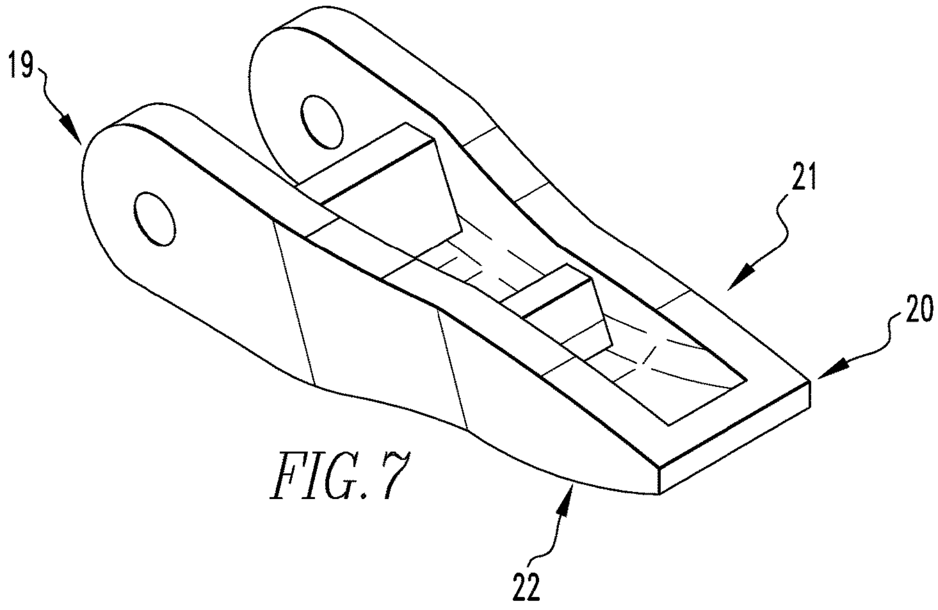
FIG. 7 shows a flipper of the present invention.

The flipper 28 is pivotally attached to the lock 26 and serves as a means to prevent the ladder rungs 6 from engaging the lock 26 during ladder length adjustment. The flipper 28 will have a first end 19 that contains means for attaching to the lock 26, such as a pin or rivet, and a second end 20 with a rounded tip. The tip is formed by a top convex surface 21 and a bottom convex surface 22 that converge at the second end, as shown in FIG. 7.

Figure 5:
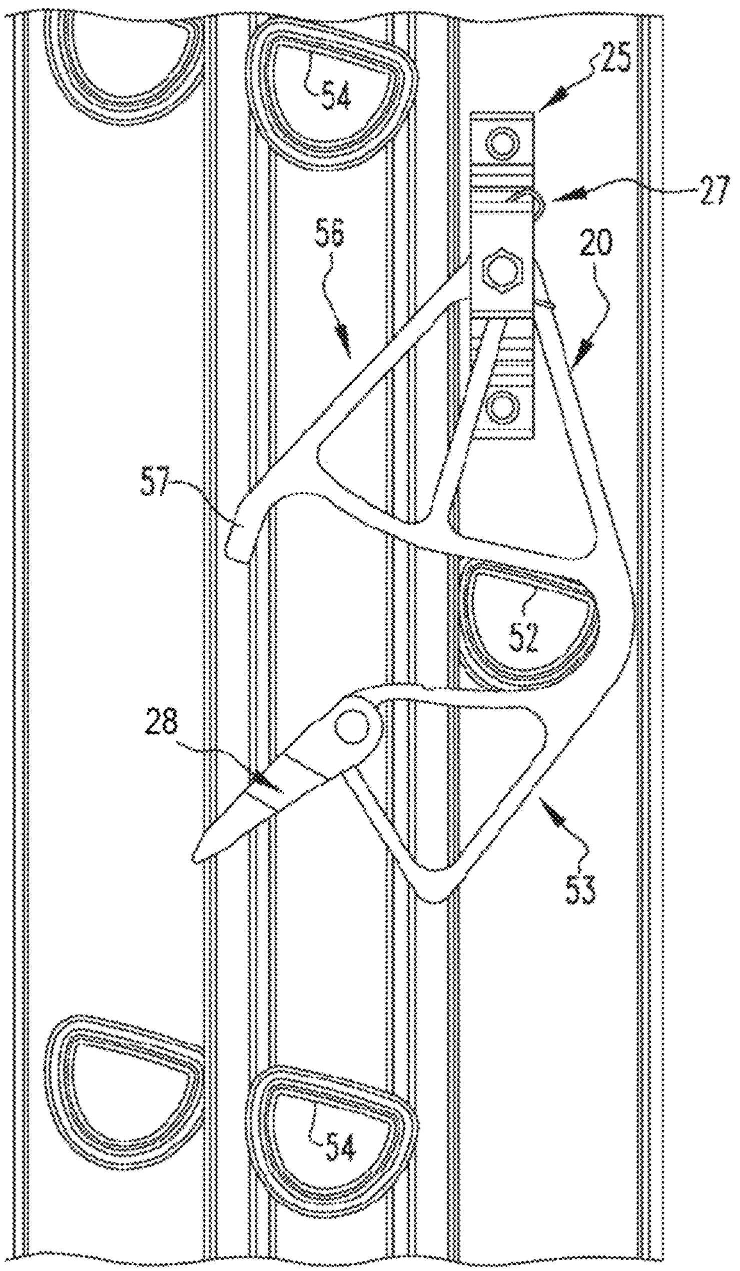
FIG. 5 is a detailed view of the lock mechanism with the top fly section moved up relative to the base and intermediate fly sections.
Figure 6:
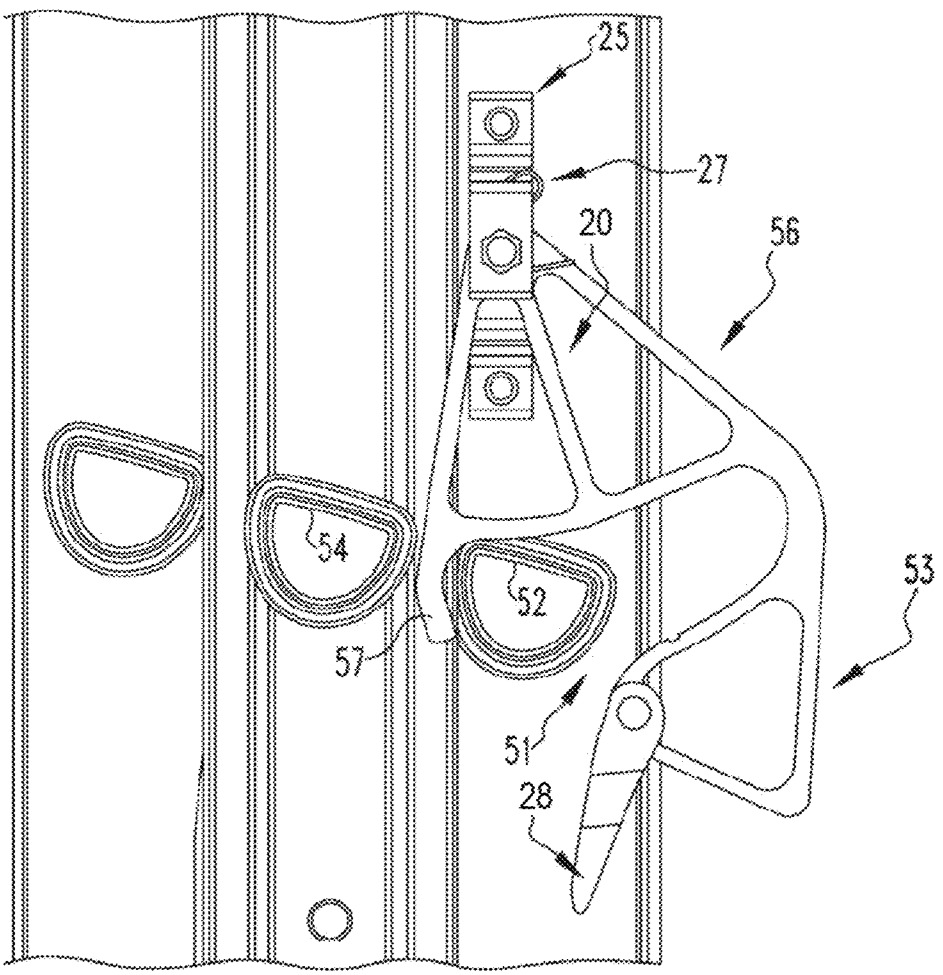
FIG. 6 is a detailed view of the lock mechanism with the top fly section moved back toward the locked position.

To better understand the operation of the lock mechanism 9 and the flipper 28, with reference to FIG. 4, the extension process can begin by moving the top fly section 3 upward relative to the base and intermediate fly sections. The envelope 51 of the locking mechanism which captures the rung 52, moves with the top fly section 3. As the locking mechanism moves up, the lower portion 53 contacts the rung 54 at point 55, causing the lock 26 to rotate counterclockwise as it moves up so the lock mechanism 9 clears the rung 54, as shown in FIG. 5.

To close the ladder 100 to the folded state, starting from FIG. 5 in regard to the top fly section 3 relative to the other two sections, the top fly section is moved down so the rung 52 is below rung 54, basically as shown again in FIG. 5 for illustration purposes, and then moved upwards. As it moves down, the flipper 28 contacts rung 54, which closes the flipper and causes the lock mechanism 9 to rotate counterclockwise out of the way of the rung 54, so it clears the rung 54. As the lock mechanism moves up, its upper portion 56 contacts the rung 54, which again causes the lock mechanism to rotate counterclockwise so the upper portion 56 clears the rung 54, and the hook 57 of the upper portion 56 to catch rung 52 and be positioned alongside rung 54. By continuing to lift the top fly section 3 slightly so the hook 57 clears rung 54, the force of the spring 27 causes the lock mechanism 9 to rotate clockwise and back into the locked position shown in FIG. 4. The top and bottom convex shapes on the flipper 28 facilitate the movement of the rung 54 against the flipper both when moving up or down, so the flipper 28 does not catch against the rung 54, and thus the lock mechanism is free to rotate as desired.

Figure 8:
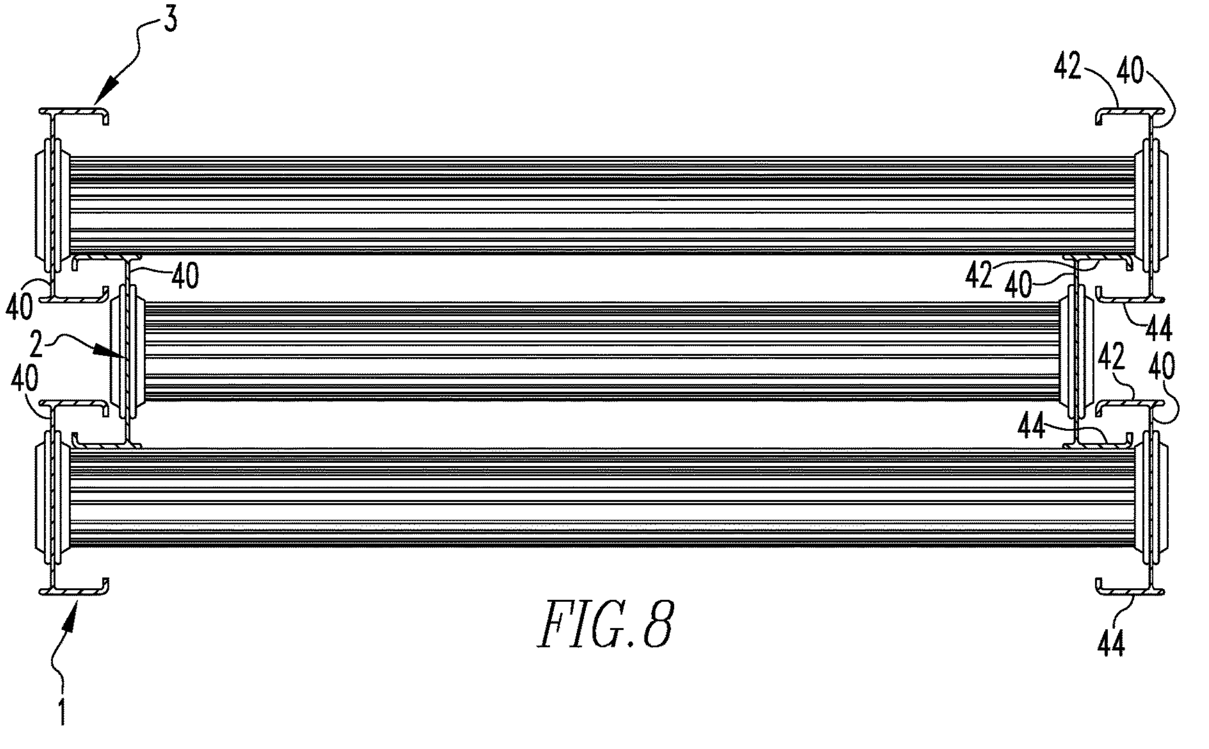
FIG. 8 is a detailed overhead view of the interlock nails of the base, intermediate and top fly sections.

FIG. 8 is a detailed view of the ladder showing the technique of interlocking the base 1, intermediately fly 2 and top fly 3 rails. All rails form a "C" shape when looking down the centerline. Both rails in the base section 1 are oriented such that the opening of the "C" is facing the centerline of the ladder. Both rails in the intermediate fly section 2 are oriented such that the opening of the "C" is facing away from the centerline of the ladder. Both rails in the top fly section 3 are oriented such that the opening of the "C" is facing the centerline of the ladder.

By the "C" of the rails of the top fly and base sections facing the "C" of the intermediate fly section 2, the rails interlock and prevent the sections from coming apart. In other words, each rail has a web 40 at its center and a first flange 42 and a second flange 44 extending from each side of the web 40. The base and top fly sections have their flanges extending toward the centerline 45 of the ladder, while the flanges of the intermediate fly section 2 extend away from the centerline 45.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An extension ladder comprising:

a base section including two base side rails and a plurality of base rungs spanning horizontally between the two base side rails, wherein the plurality of base side rails are fixed a set distance apart;

an intermediate fly section including two intermediate side rails and a plurality of intermediate rungs spanning horizontally between the two intermediate side rails, wherein the plurality of intermediate side rails are fixed a set distance apart, the intermediate fly section slidably coupled to the base section;

a top fly section including two top side rails and a plurality of top rungs spanning horizontally between the two top side rails, wherein the plurality of top side rails are fixed a set distance apart, the top fly section slidingly coupled to the intermediate fly section with the intermediate fly section disposed between the base section and the top fly section;

a first lock mechanism attached to an inward facing portion of an intermediate side rail of the intermediate fly section and configured to engage with one of the plurality of base rungs;

a second lock mechanism attached to an inward facing portion of a top side rail of the top fly section and configured to engage with one of the plurality of intermediate rungs; and a handle having a first strap portion coupled to a base side rail of the base section and a second strap portion coupled to the top side rail of the top fly section, the first strap portion having a first buckle portion, the second strap portion having a second buckle portion for engaging the first buckle portion, the handle extending from the base side rail across the intermediate side rail of the intermediate fly section to the top side rail when the first buckle portion engages the second buckle portion;

wherein the first lock mechanism is disposed adjacent to a lowermost rung of the intermediate fly section and the second lock mechanism is disposed adjacent to a second lowermost rung of the top fly section.

2. The extension ladder of claim 1 wherein the base section has two pivoting feet located at a bottom of the base section which allows adjustability for undesirable ground surfaces when the base section, intermediate fly and top fly sections are in an extended state, and wherein the top fly section has two end caps.

3. The extension ladder of claim 1, wherein the first lock mechanism is attached to the intermediate side rail between a first bottom most intermediate rung and a second bottom most intermediate rung, and wherein the second lock mechanism the second lock mechanism is attached to the top side rail between a second bottom most top rung and a third bottom most top rung.

4. The extension ladder of claim 1 wherein the two intermediate side rails selectively interlock with the two base side rails and the two top side rails.

5. The extension ladder of claim 1, wherein the first lock mechanism is configured to selectively permit and prohibit movement of the base section relative to the intermediate fly section.

6. The extension ladder of claim 5, wherein the first lock mechanism includes a flipper configured to prevent one of the plurality of base rungs from engaging with the first lock mechanism when the intermediate fly section is being extended.

7. The extension ladder of claim 1, wherein the first lock mechanism includes a lock bracket coupled to one of the two intermediate side rails and a spring coupled to the lock bracket and the first lock mechanism, wherein the spring is configured to provide a rotational force to the first lock mechanism to engage one of the plurality of base rungs to selectively lock the intermediate fly section relative to the base section.

8. The extension ladder of claim 7, wherein the two intermediate side rails of the intermediate fly section include a first flange adjacent the top fly section and a second flange adjacent the base section, wherein the first flange and the second flange are connected by a web.

9. The extension ladder of claim 8, wherein the lock bracket is disposed adjacent the first flange, and wherein, along with the spring, the first lock mechanism is configured to avoid contacting the top fly section while being extended.

10. The extension ladder of claim 8, wherein the second lock mechanism includes a flipper configured to prevent one of the plurality of intermediate rungs of the intermediate fly section from engaging with the second lock mechanism when the top fly section is being extended.

11. The extension ladder of claim 1, wherein the second lock mechanism is configured to permit and prohibit movement of the intermediate fly section relative to the top fly section.

12. The extension ladder of claim 1, wherein the second lock mechanism includes a lock bracket coupled to one of the two top side rails of the top fly section and a spring coupled to the lock bracket and the second lock mechanism, wherein the spring is configured to provide a rotational force to the second lock mechanism to engage one of the plurality of intermediate rungs of the intermediate fly section to lock the top fly section relative to the intermediate fly section.

13. The extension ladder of claim 12, wherein the two top side rails of the top fly section include a first flange and a second flange adjacent the intermediate fly section, wherein the first flange and the second flange are connected by a web.

14. The extension ladder of claim 13, wherein the lock bracket is disposed adjacent the first flange.

15. The extension ladder of claim 1, further comprising two first lock mechanisms disposed on each of the two intermediate side rails of the intermediate fly section.

16. The extension ladder of claim 1, further comprising two second lock mechanisms disposed on each of the two top side rails of the top fly section.

17. An extension ladder comprising:

a base section including two base side rails, the two base side rails having a C-shaped cross section facing towards a centerline of the extension ladder, with base rungs spanning horizontally between the two base side rails;

an intermediate fly section including two intermediate side rails, the two intermediate side rails having a C-shaped cross section facing away from the centerline, with intermediate rungs spanning horizontally between the two intermediate side rails, the intermediate fly section slidably coupled to the base section;

a top fly section including two top side rails, the two top side rails having a C-shaped cross section facing towards the centerline, with top rungs spanning horizontally between the two top side rails, the top fly section slidingly coupled to the intermediate fly section with the intermediate fly section disposed between the base section and the top fly section, wherein the C-shaped cross section of the two base side rails slidingly engage with the C-shaped cross section of the two intermediate side rails;

a first lock mechanism attached to an inward facing portion of an intermediate side rail of the intermediate fly section and configured to engage with one of the base rungs;

a second lock mechanism attached to an inward facing portion of a top side rail of the top fly section and configured to engage with one of the intermediate rungs; and a handle having a first strap portion coupled to a base side rail of the base section and a second strap portion coupled to the top side rail of the top fly section, the first strap portion having a first buckle portion, the second strap portion having a second buckle portion for engaging the first buckle portion, the handle extending from the base side rail across the intermediate side rail of the intermediate fly section to the top side rail when the first buckle portion engages the second buckle portion;

wherein the first lock mechanism is disposed adjacent to a lowermost rung of the intermediate fly section and the second lock mechanism is disposed adjacent to a second lowermost rung of the top fly section.

18. The extension ladder of claim 17, wherein handle further includes a grip positioned about the second strap portion.

* * * * *